(12) United States Patent
Okamoto

(10) Patent No.: US 7,593,633 B2
(45) Date of Patent: Sep. 22, 2009

(54) IMAGE-TAKING APPARATUS

(75) Inventor: Satoshi Okamoto, Asaka (JP)

(73) Assignee: Fujifilm Corporation, Tokyo (JP)

( * ) Notice: Subject to any disclaimer, the term of this patent is extended or adjusted under 35 U.S.C. 154(b) by 518 days.

(21) Appl. No.: 11/581,584

(22) Filed: Oct. 17, 2006

(65) Prior Publication Data
US 2007/0086761 A1 Apr. 19, 2007

(30) Foreign Application Priority Data
Oct. 18, 2005 (JP) ............... 2005-302765

(51) Int. Cl.
G03B 7/00 (2006.01)
G03B 41/00 (2006.01)
(52) U.S. Cl. .............. 396/222; 396/234; 396/322
(58) Field of Classification Search ............... 396/222, 396/234, 322
See application file for complete search history.

(56) References Cited
U.S. PATENT DOCUMENTS
6,249,317 B1 * 6/2001 Hashimoto et al. .......... 348/364

2003/0071908 A1 * 4/2003 Sannoh et al. .............. 348/345
2003/0214600 A1 * 11/2003 Kido ......................... 348/362
2004/0227826 A1 * 11/2004 Wu et al. .................... 348/239
2005/0062875 A1 * 3/2005 Ojima ........................ 348/362
2006/0216016 A1 * 9/2006 Eun ........................... 396/222
2007/0110422 A1 * 5/2007 Minato et al. ................ 396/89

FOREIGN PATENT DOCUMENTS
JP 2003-10755 A 1/2003
JP 2005-86682 A 3/2005

* cited by examiner

Primary Examiner—W B Perkey
(74) Attorney, Agent, or Firm—Birch, Stewart, Kolasch & Birch, LLP

(57) ABSTRACT

An image-taking apparatus includes: a face-detecting section that detects a face in a subject image; and a face-metering section that meters individual faces when the faces are detected by the face-detecting section, thereby obtaining metered values for the respective faces. The apparatus further includes a calculation section that calculates correct exposure values for the respective faces based on the metered values obtained by the face-metering section. The apparatus further includes a shooting section that performs, in response to a single shooting instruction, shootings with correct exposures for the respective faces based on the correct exposure values for the respective faces calculated by the calculation section.

8 Claims, 12 Drawing Sheets

IMAGE-TAKING APPARATUS

BACKGROUND OF THE INVENTION

1. Field of the Invention

The present invention relates to an image-taking apparatus that includes an imaging device and generates image data representing a subject image formed on the imaging device in response to a shooting operation.

2. Description of the Related Art

A digital camera is a typical example of image-taking apparatus. Conventional digital cameras have an exposure control system, which is a technique for determining exposure, such as average metering, multi-zone metering, center-weighted metering and spot metering. Any of these employed in a digital camera as an exposure control system depends on the type of the digital camera.

The average metering is a system that obtains an average intensity by metering the entire shooting area and determines an exposure based on the result of metering. The multi-zone metering is a system that divides a shooting area into multiple metered areas and determines an exposure based on the result of measuring the metered areas. The center-weighted metering is a system that meters a central portion (30% to 40%) of a shooting area and determines the exposure based on the result of measuring the central portion. The spot metering is a system that meters a center (several percent) of a shooting area and determines the exposure based on the result of measuring the center.

However, these systems may not be suitable for shooting of an image including a person, because an exposure value obtained by these systems is not always appropriate for the face of a person in the image.

Japanese Patent Application Publication No. 2003-10755 proposes a technique for shooting an image with an exposure value suitable for the face of a person in the image. In this technique, the face of a person in an image is detected, and metering is respectively performed on the detected face and a shooting area corresponding to the entire screen. Based on the metering results, an exposure value centered on the face portion is determined so that an image can be taken with a correct exposure for the face.

Meanwhile, Japanese Patent Application Publication No. 2005-86682 discloses a technique for metering one selected from two or more faces when the faces are detected, and shooting an image with a correct exposure for the selected face based on the result of the metering.

According to the technique disclosed in Japanese Patent Application Publication No. 2003-10755, it is possible to shoot an image including only one person with a correct exposure for the face of the person.

However, the technique disclosed in Japanese Patent Application Publication No. 2003-10755 has such a drawback that it is incapable of obtaining an exposure value centered on two or more faces of different intensity levels when the faces are detected, resulting in a shooting with an exposure value unsuitable for some faces.

Also, the technique disclosed in Japanese Patent Application Publication No. 2005-86682 has such a problem that because the exposure is made suitable for the selected one of the two or more faces, an image is taken with the exposure suitable only for the selected face but unsuitable for other faces.

SUMMARY OF THE INVENTION

The present invention has been made in view of the above circumstances, and provides an image-taking apparatus capable of shooting an image with an exposure value suitable for each face, even when two or more faces are detected in a shooting area.

A first image-taking apparatus of the invention is an image-taking apparatus that includes an imaging device and generates image data representing a subject image formed on the imaging device in response to a shooting operation, the apparatus including:

a face-detecting section that detects a face in the subject image;

a face-metering section that meters individual faces when the faces are detected by the face-detecting section, thereby obtaining metered values for the respective faces;

a calculation section that calculates correct exposure values for the respective faces based on the metered values obtained by the face-metering section; and a shooting section that performs, in response to a single shooting instruction, shootings with correct exposures for the respective faces based on the correct exposure values for the respective faces calculated by the calculation section.

The first image-taking apparatus obtains image data with correct exposures for the respective faces by performing shootings based on correct exposure values for the respective faces. Therefore, for example, after carrying out shooting for people in commemoration of an event, a user can give each person a printed image with a correct exposure suited to each person's face.

In the first image-taking apparatus, preferably, when no face is detected by the face-detecting section, the shooting section performs a shooting based on an average correct exposure value for a shooting area.

This is because when no face is detected, correct exposure for face is unnecessary and thus, it is preferable to adopt an average correct exposure value for the shooting area.

A second image-taking apparatus of the invention is an image-taking apparatus that includes an imaging device and generates image data representing a subject image formed on the imaging device in response to a shooting operation, the apparatus including:

a face-detecting section that detects a face in the subject image;

a metering section that meters brightness in a shooting area and also meters individual faces when the faces are detected by the face-detecting section, thereby obtaining a metered value for the shooting area and metered values for the respective faces;

a calculation section that calculates an average correct exposure value for the shooting area based on the metered value for the shooting area obtained by the metering section, and also calculates correct exposure values for the respective faces based on the metered values for the respective faces obtained by the metering section;

a shooting section that, in response to a single shooting instruction, performs a shooting with a correct exposure for the shooting area based on the correct exposure value for the shooting area calculated by the calculation section, and also performs shootings with correct exposures for the respective faces based on the correct exposure values for the respective faces calculated by the calculation section; and a replacement section that replaces pieces of image data representing faces in image data generated by the shooting based on the average correct exposure value for the shooting area calculated by the calculation section, with pieces of image data representing the corresponding faces in image data generated by the shootings performed by the shooting section.

In the second image-taking apparatus, when image data generated based on an average correct exposure value for a shooting area includes image data representing faces, this image data representing faces is replaced with image data representing the corresponding faces generated based on correct exposure values for the respective faces. As a result, there is produced image data for one image that includes the faces with exposures suited to the respective faces. Accordingly, it is possible for a user to obtain image data for one image that incorporates both the result of metering the entire shooting area and the results of metering the faces.

In the second image-taking apparatus, preferably, when no face is detected by the face-detecting section, the shooting section performs a shooting based on the average correct exposure value for the shooting area and the replacement section stops operating.

When no face is detected, it is preferable to adopt an average correct exposure value for the shooting area and thus, there is no need to operate the replacement section.

Further, in the second image-taking apparatus, it is preferable that only for a face whose face position on a first image obtained by a shooting based on the average correct exposure value for the shooting area calculated by the calculation section matches a face position of a corresponding face in a second image obtained by a shooting based on the correct exposure value for each face calculated by the calculation section, the replacement section replaces image data representing the face in the first image with image data representing the corresponding face in the second image.

This is because when image data is replaced while the position of a face representing the image data is moving, continuity in an image is impaired and thus, it is preferable to replace only image data representing a face whose position is still.

A third image-taking apparatus of the invention is an image-taking apparatus that includes an imaging device and generates image data representing a subject image formed on the imaging device in response to a shooting operation, the apparatus including:

a face-detecting section that detects a face in the subject image;

a metering section that meters brightness in a shooting area and also meters individual faces when the faces are detected by the face-detecting section, thereby obtaining a metered value for the shooting area and metered values for the respective faces;

a calculation section that calculates an average correct exposure value for the shooting area based on the metered value for the shooting area obtained by the metering section, and also calculates correct exposure values for the respective faces based on the metered values for the respective faces obtained by the metering section;

a shooting section that, in response to a single shooting instruction, performs a shooting with a correct exposure for the shooting area based on the correct exposure value for the shooting area calculated by the calculation section, and also performs shootings with correct exposures for the respective faces based on the correct exposure values for the respective faces calculated by the calculation section; and an adjustment section that adjusts pieces of image data representing faces in image data generated by the shooting based on the average correct exposure value for the shooting area calculated by the calculation section, to pieces of image data identical to pieces of image data representing the corresponding faces in image data generated by the shootings performed by the shooting section.

In the third image-taking apparatus, pieces of image data representing faces in image data generated by the shooting based on the average correct exposure value for the shooting area calculated by the calculation section are adjusted to pieces of image data identical to pieces of image data representing the corresponding faces in image data generated by the shootings performed by the shooting section. Therefore, image data representing the faces shot based on the respective correct exposure values can be present in image data representing a single image. Accordingly, it is possible for a user to obtain image data in which correct exposures for both each face and the shooting area are achieved.

In the third image-taking apparatus, it is preferable that when no face is detected by the face-detecting section, the shooting section performs a shooting based on the average correct exposure value for the shooting area and the adjustment section stops operating.

When no face is detected, it is preferable to adopt an average correct exposure value for the shooting area and thus, there is no need to operate the adjustment section.

In the third image-taking apparatus, it is preferable that only for a face whose face position on a first image obtained by a shooting based on the average correct exposure value for the shooting area calculated by the calculation section matches a face position of a corresponding face in a second image obtained by a shooting based on the correct exposure value for each face calculated by the calculation section, the adjustment section adjusts image data representing the face in the first image to image data identical to image data representing the corresponding face in the second image.

This is because when image data is corrected while the position of a face representing the image data is moving, undesirable results such as correction of a portion other than the face may be obtained and thus, it is preferable to correct only image data representing a face whose position is still.

As describe above, according to the invention, it is possible to provide an image-taking apparatus capable of shooting an image with an exposure value suitable for each face, even when two or more faces are detected in a shooting area.

DETAILED DESCRIPTION OF THE INVENTION

Embodiments of the present invention will be described with reference to the drawings.

Figure 1:
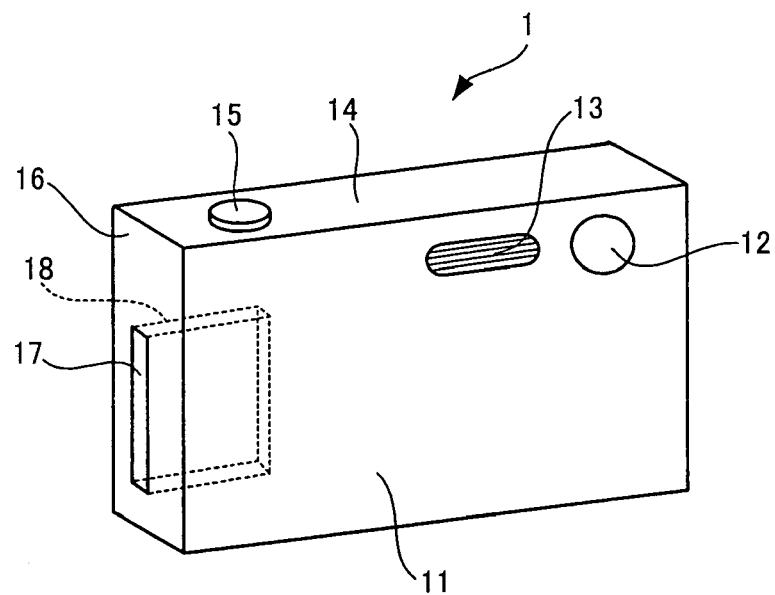
FIG. 1 is an external perspective view of a digital camera according to an embodiment of the first image-taking apparatus of the invention.

FIG. 1 is an external perspective view of a digital camera 1 according to an embodiment of the first image-taking apparatus of the invention.

Figure 2:
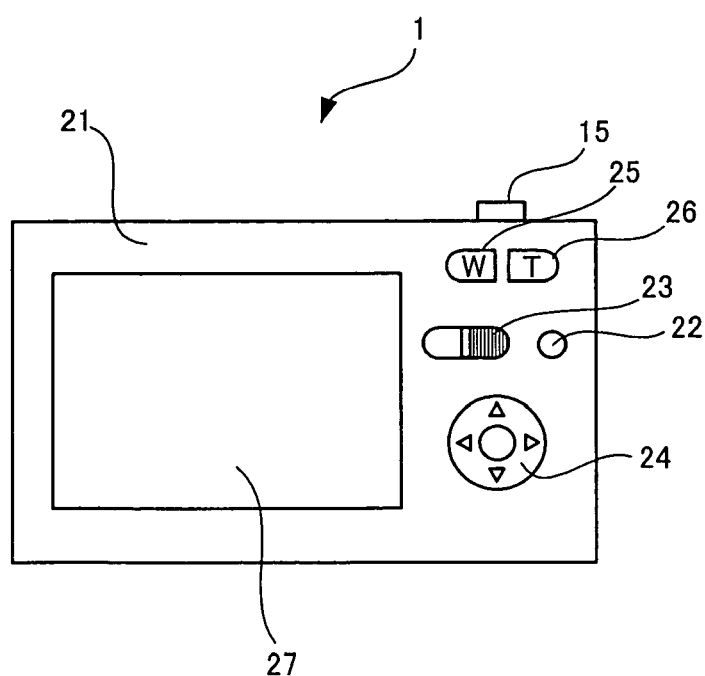
FIG. 2 is a diagram showing the back of the digital camera shown in FIG. 1.

FIG. 2 is a diagram showing the back of the digital camera 1 shown in FIG. 1.

As shown in FIG. 1, a front surface 11 of the digital camera 1 is provided with an objective lens 12 for guiding subject light to a lens group disposed inside the digital camera 1 and a flash window 13 through which a flash is emitted to a subject. Meanwhile, a top surface 14 of the digital camera 1 is provided with a release button 15. A still image can be taken at the press of the release button 15.

A flank 16 of the digital camera 1 is provided with a recording-medium slot 17 into which a recording medium 18 for recording image data is removably inserted.

As shown in FIG. 2, a power button 22 and a mode switch 23 are disposed on a back surface 21 of the digital camera 1. The power button 22 is used to power on/off the digital camera 1, while the mode switch 23 is used to switch between a shooting mode and a replay mode.

The back surface 21 of the digital camera 1 is also provided with a menu-selection/execution key 24 that is a key used for changing a menu for shooting. The menu-selection/execution key 24 is also used for selecting a condition and executing the selected condition.

The back surface 21 of the digital camera 1 is further provided with a wide-angle zoom key 25, a telephoto zoom key 26 and a liquid crystal display (LCD) panel 27. The wide-angle zoom key 25 is used to change the focal length to the wide-angle side, while the telephoto zoom key 26 is used to change the focal length to the telephoto side. The LCD panel 27 displays an image of a subject and a menu etc. used for the menu-selection/execution key 24.

Next, the internal configuration of the digital camera 1 will be described.

Figure 3:
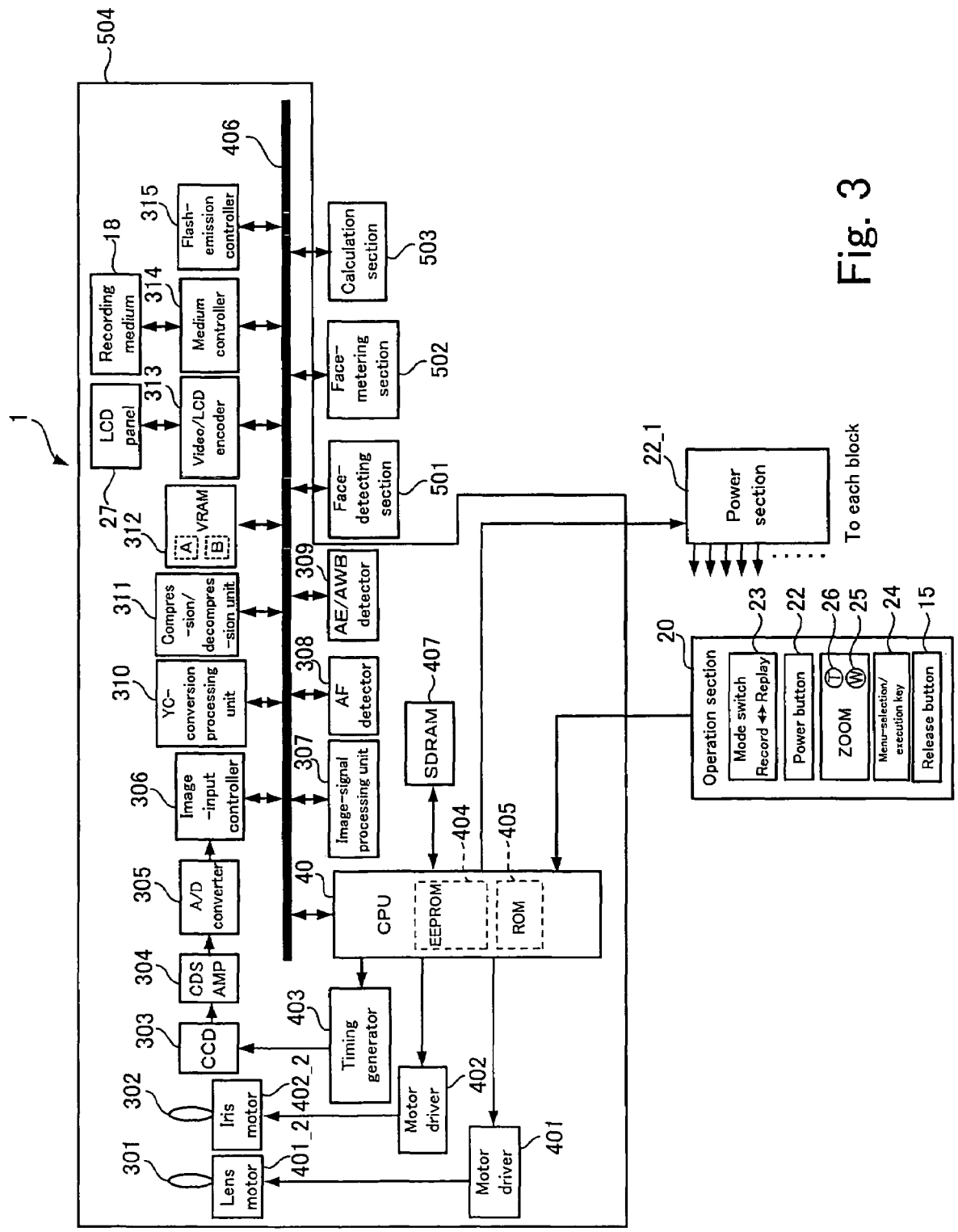
FIG. 3 is a block diagram illustrating the internal configuration of the digital camera shown in FIGS. 1 and 2.

FIG. 3 is a block diagram illustrating the internal configuration of the digital camera 1 shown in FIGS. 1 and 2.

The digital camera 1 has a shooting lens 301, an iris 302 and a charge-coupled device (CCD) 303. The shooting lens 301 is schematically shown as one lens for convenience of explanation.

The iris 302 is used to reduce or shield subject light.

The CCD 303 is a solid imaging device for capturing subject light coming through the lens 31.

The digital camera 1 also includes a lens motor driver 401, a lens motor 401_2, an iris motor driver 402, an iris motor 402_2 and a timing generator 403.

The lens motor driver 401 is a driver for driving the lens 301 via the lens motor 401_2, and the iris motor driver 402 is a driver for opening/closing the iris 302 via the iris motor 402_2. The timing generator 403 is an element to notify the CCD 303 of an exposure starting/ending time which is the so-called shutter speed.

The digital camera 1 also includes a CPU 40 having an EEPROM 404 that is a rewritable nonvolatile memory. The CPU 40 has a built-in ROM 405 where a program is stored. The CPU 40 controls the operation of the digital camera 1 according to procedures described in this program.

The digital camera 1 also includes a CDSAMP 304 and an A/D converter 305. The CDSAMP 304 performs processing such as processing for reducing noise in analog image signals output from the CCD 303, and the A/D converter 305 converts the analog image signals into digital image signals.

The digital camera 1 also includes an image-input controller 306 and an image-signal processing unit 307. The image-input controller 306 transfers image data represented by the digital image signals output from the A/D converter 305 to a SDRAM 407 via a data bus 406. The SDRAM 407 is a memory where the image data is temporarily stored. The image-signal processing unit 307 applies image processing to the image data stored in the SDRAM 407.

The digital camera 1 further includes an AF detector 308 and an AE/AWB detector 309. The AF detector 308 detects focus information on an image, and the AE/AWB detector 309 detects white-balance information by determining an aperture value and a shutter speed.

The digital camera 1 further includes a face-detecting section 501, a face-metering section 502 and a calculation section 503. The face-detecting section 501 detects one or more faces in a subject image. Upon detection of the faces by the face-detecting section 501, the face-metering section 502 meters each of the detected faces, thereby obtaining a metered value for each face. The calculation section 503 calculates an exposure value for each face based on the metered value for each face obtained by the face-metering section 502. The face-detecting section 501, the face-metering section 502 and the calculation section 503 will be described later more in detail.

The digital camera 1 further includes a YC-conversion processing unit 310, a compression/decompression unit 311 and a VRAM 312. The YC-conversion processing unit 310 converts digital image signals received via the data bus 406 into YC signals composed of luminance (Y) and chrominance (C) The compression/decompression unit 311 compresses the image data represented by the YC signals in response to a command from the CPU 40. The VRAM 312 is a memory for storing contents to be displayed on the LCD panel 27 and has two buffer areas A and B.

The digital camera 1 also includes a Video/LCD encoder 313, a medium controller 314 and a flash-emission controller 315. The Video/LCD encoder 313 converts the image data into video signals. Through (live) image data of low resolution stored in the VRAM 312 is transmitted in a first-in, first-out manner to the LCD panel 27 via the Video/LCD encoder 313. Thus, a through image is displayed on the LCD panel 27. The medium controller 314 controls recording of image data on the recording medium 18. The flash-emission controller 315 controls emission of a flash to be emitted through the flash window 13.

The digital camera 1 further includes an operation section 20 and a power section 22_1. In response to each of the operating members being operated, which are disposed on the back surface 21 and the top surface 14 of the digital camera 1 described with reference to FIG. 2, the operation section 20 sends a command for executing processing represented by the operated member to the CPU 40. The power section 22_1 supplies power to each block in response to a power-on operation.

The digital camera 1 is provided with a shooting section 504. The shooting section 504 corresponds to the above-described internal configuration of the digital camera 1 except for the face-detecting section 501, the face-metering section 502, the calculation section 503, the operation section 20 and the power section 22_1. In response to detection of faces by the face-detecting section 501, instead of performing a normal shooting based on average metering, the shooting section 504 performs shooting processing the number of times equal to the number of the detected faces based on a correct exposure value for each face calculated by the calculation section 503, so that a correct exposure is applied to each face.

Next, there will be described shooting operation performed by the digital camera 1.

The shooting operation of the digital camera 1 is controlled by the CPU 40.

First, upon turning on of the power button 22 by a user, the operation section 20 detects this power-on operation and the CPU 40 starts running the program stored in the ROM 405. Then, an image is displayed on the LCD panel 27 and the digital camera 1 becomes ready to accept operations for setting a shooting condition or a press of the release button 15. Upon selection of a shooting mode through the menu-selection/execution key 24, a screen as shown in FIG. 4 is displayed on the LCD panel 27.

Figure 4:
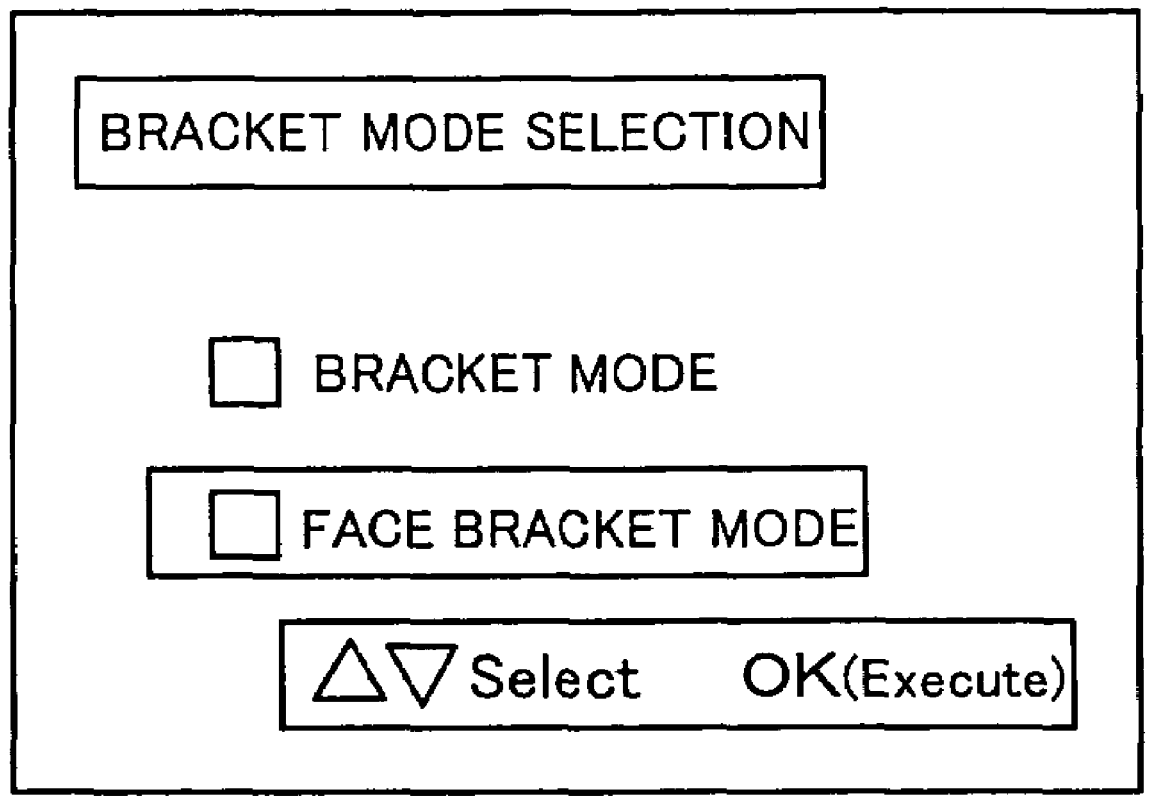
FIG. 4 is a diagram showing a menu screen that allows a user to decide whether a shooting based on face detection is to be performed or not.

FIG. 4 is a diagram showing a menu screen that allows a user to decide whether a shooting based on face detection is to be performed or not.

A "BRACKET MODE" shown in FIG. 2 is a mode of shooting based on an average correct exposure value for a shooting area, and a "FACE BRACKET MODE" is a mode of shooting based on face detection.

When the user selects and executes FACE BRACKET MODE using the menu-selection/execution key 24, the digital camera 1 of the embodiment performs a shooting with a correct exposure for each face. The details will be described later.

When the user selects a shooting angle of view by operating the wide-angle zoom key 25 or telephoto zoom key 26 disposed on the back surface 21 of the digital camera 1, the selected angle of view is transmitted to the CPU 40. The CPU 40 then controls the lens motor 401_2 so that the lens motor 401_2 moves the lens 301 according to the selected angle of view.

Meanwhile, a user carries out shooting based on a through image displayed on the LCD panel 27. Therefore, the AF detector 308 constantly detects a focus position and the CPU 40 moves the lens 301 to the detected focus position so that a through image of a subject to which the digital camera 1 is directed is constantly displayed.

Figure 5:
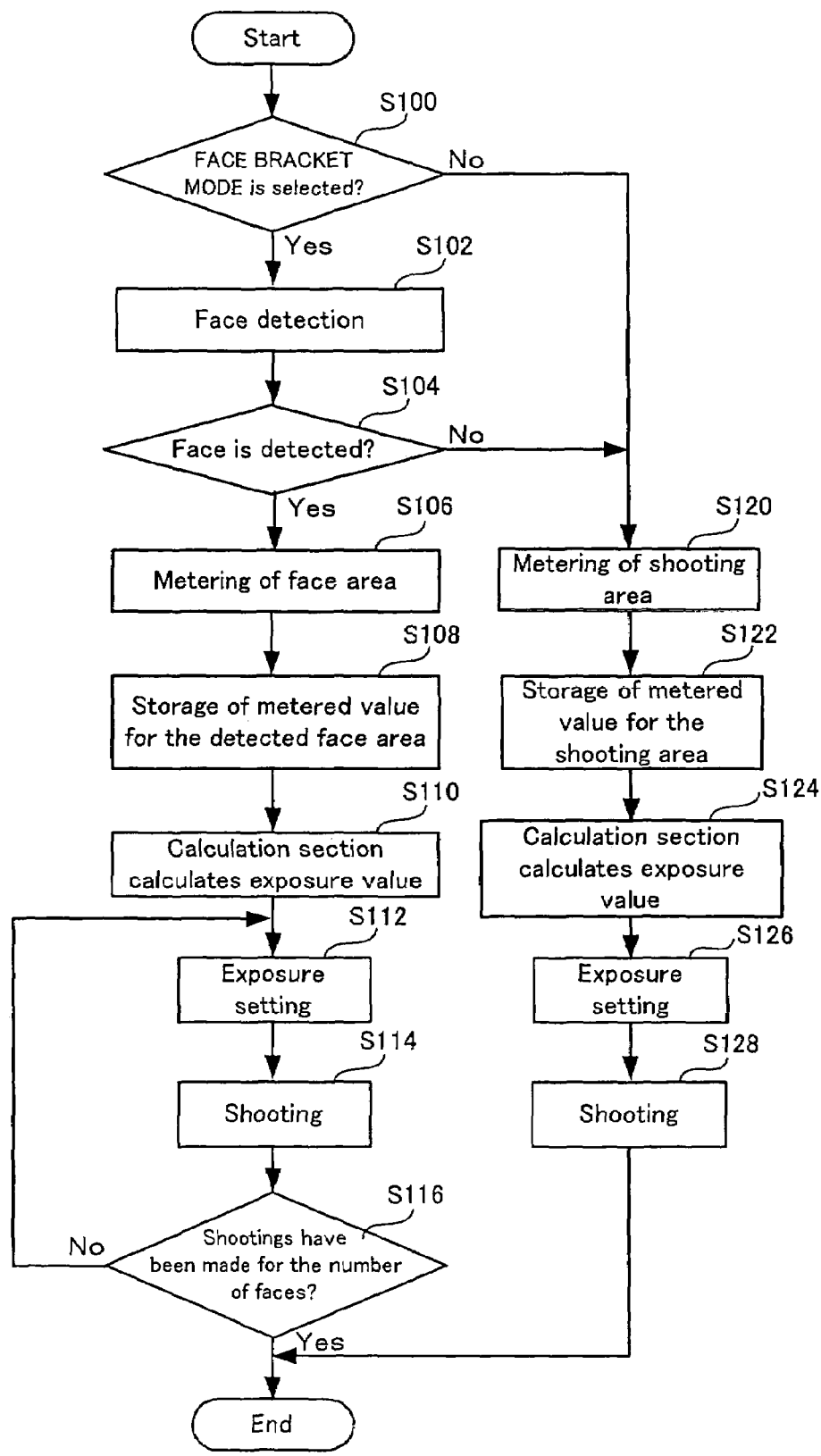
FIG. 5 is a flowchart showing shooting operation performed by the digital camera according to the embodiment of the first image-taking apparatus of the invention.

Here, upon a half press of the release button 15, shooting operation as shown in FIG. 5 begins.

FIG. 5 is a flowchart showing shooting operation performed by the digital camera 1 according to the embodiment of the first image-taking apparatus of the invention.

First, the CPU 40 determines whether FACE BRACKET MODE is selected or not (step S100).

If it is determined that FACE BRACKET MODE is selected, the CPU 40 causes the face-detecting section 501 to execute processing for detecting a face in a subject image (step S102).

Figure 6:
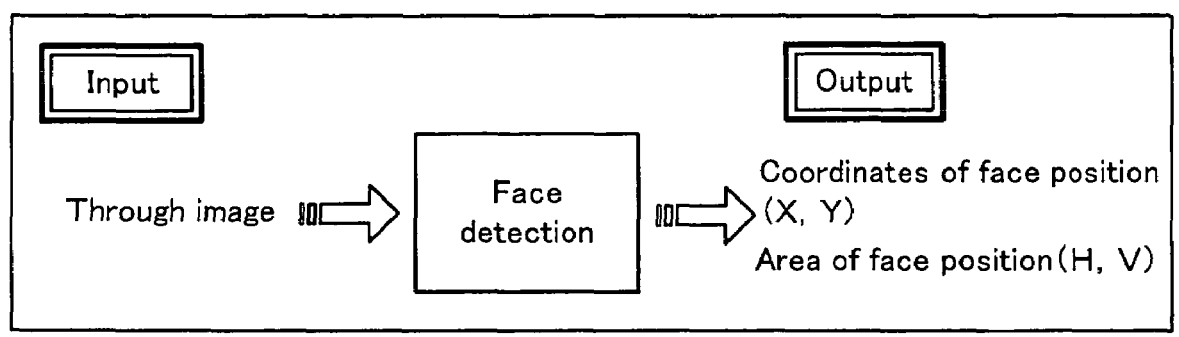
FIG. 6 is a conceptual diagram showing processing performed by a face-detecting section.

FIG. 6 is a conceptual diagram showing the processing performed by the face-detecting section 501.

The face-detecting section 501 uses image data representing a through image displayed on the LCD panel 27 as input data. The face-detecting section 501 detects a face portion in a subject image by extracting flesh-color portions from the image data representing the through image. Subsequently, the face-detecting section 501 determines, as output data, data representing the coordinates of the position of the face within a shooting area and data (horizontal and vertical widths) representing the area where the face is present. The data is obtained for the number of faces present in the shooting area.

Returning to FIG. 5, the description will be continued.

Subsequently, it is determined whether a face is detected or not (step S104).

If it is determined that a face is detected, the flow proceeds to step S106 where the face-metering section 502 meters the detected face or meters every face when two or more faces are detected by the face-detecting section 501. In the following description, it is assumed that two or more faces are detected and every detected face is metered.

Figure 7:
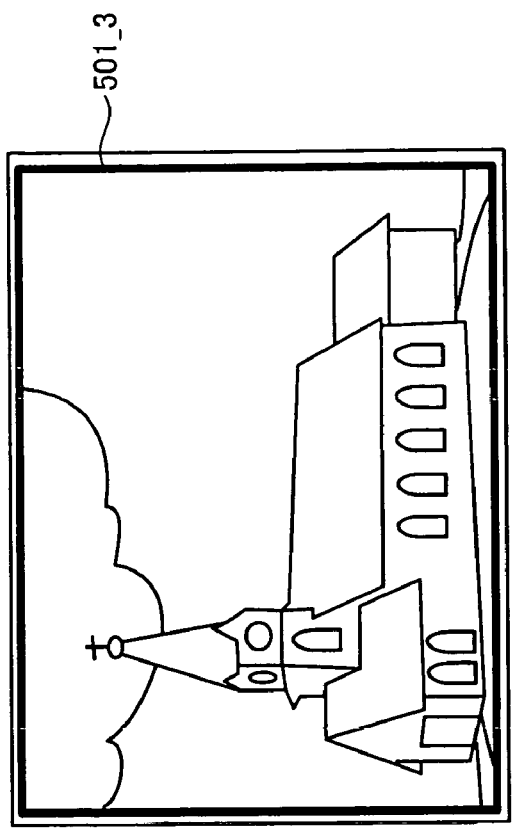
FIGS. 7(a) and 7(b) are conceptual diagrams showing areas to be metered by a face-metering section.
Figure 7:
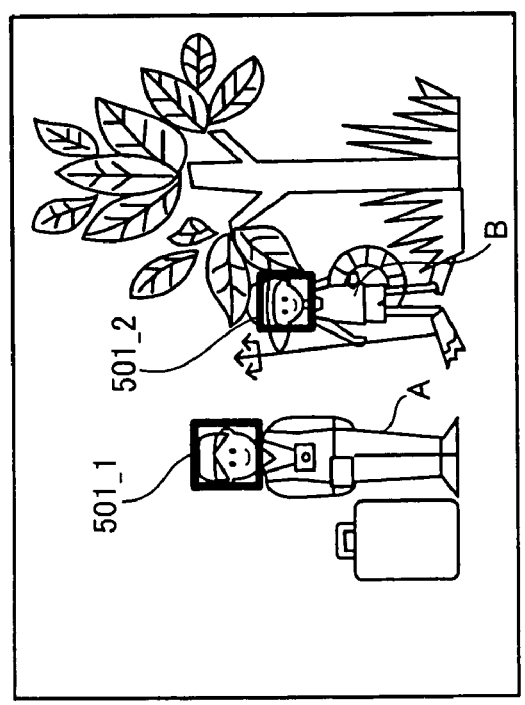

FIGS. 7(*a*) and 7(*b*) are conceptual diagrams showing areas to be metered by the face-metering section 502.

FIG. 7(*a*) shows a case where faces of a person A and a person B are detected by the face-detecting section 501 and face-detected areas 501_1 and 501_2 each enclosed in a box are displayed on the LCD panel 27.

The face-metering section 501 meters each of the face-detected areas 501_1 and 501_2 thereby obtaining metered values for the respective areas, and stores the obtained values in the SDRAM 407 (step S108).

Next, the calculation section 503 calculates correct exposure values for the respective faces based on the metered values obtained by the face-metering section 501 (step S110).

Subsequently, the correct exposure value for each of the faces calculated by the calculation section 503 is set, and the AE/AWB detector 309 determines an aperture value and a shutter speed based on the set value (step S112).

In response to a full press of the release button 15 by the user, a shooting is performed based on the correct exposure value of one of the faces in the shooting area (step S114).

To be more specific (see FIG. 3), first, the operation section 20 transmits a shooting start signal to the CPU 40. Upon receipt of the shooting start signal, the CPU 40 causes the iris motor driver 402 to open the iris 302, and causes the timing generator 403 to activate the CCD 303 so that the CCD 303 starts exposure. Then, image data representing a subject image formed on the CCD 303 is output to the CDSAMP 304. The CDSAMP 304 reduces noise in the image data output by the CCD 303 and the image data with the reduced noise is supplied to the A/D converter 305. The A/D converter 305 then generates RGB image data by subjecting the received image data to an analog-to-digital signal conversion. The image data generated by the A/D converter 305 is sent to the image-signal processing unit 307 where the image data is subjected to image processing. The image data after being subjected to the image processing is then stored in the SDRAM 407. The image data stored in the SDRAM 407 is supplied to the YC-conversion processing unit 310 where the image data is subjected to a RGB-to-YC signal conversion.

Subsequently, the image data is compressed and stored in the VRAM 312. The image data stored in the VRAM 312 is sent to the LCD panel 27 after being converted into video signals by the Video/LCD encoder 313 and also sent to the recording medium 18 to be stored therein.

Upon completion of the shooting for one face (person), it is determined whether shootings have been made for the number of faces or not (step S116). If it is determined that shootings have not been made for the number of faces, the flow returns to step S112. If it is determined that shootings have been made for the number of faces, this processing routine ends.

Meanwhile, if it is determined that FACE BRACKET MODE is not selected at step S100 or no face is detected by the face-detecting section 501 at step S104, the flow proceeds to step S120. At step S120, the face-metering section 502 switches the metered area to the entire screen and meters average brightness in a shooting area corresponding to the entire screen thereby obtaining a metered value. FIG. 7(*b*) shows a case where a metered area 501_3 enclosed in a box is displayed on the LCD panel 27.

The metered value thus obtained by the metering is stored in the SDRAM 407 (step S122).

At step S124, the calculation section 503 calculates an average correct exposure value for the metered area 501_3 serving as a shooting area, based on the metered value stored in the SDRAM 407 at step S122.

Subsequently, the average correct exposure value calculated by the calculation section 503 is set, and the AE/AWB detector 309 determines an aperture value and a shutter speed based on the set value (step S126).

In response to a full press of the release button 15 by the user, a shooting is performed based on the average correct exposure value for the shooting area (step S128), and image data generated by the shooting is stored in the recording medium 18 in accordance with the processing by the shooting section 504. This processing routine is then completed.

In the digital camera 1 according to the embodiment of the first image-taking apparatus of the invention, it is possible to obtain image data with a correct exposure suited to each face, by performing a shooting for the number of faces with a correct exposure for each face. Therefore, after carrying out a shooting for people for example in commemoration of an event, a user can give each person a printed image obtained with a correct exposure suited to each person's face.

This concludes the description of the embodiment of the first image-taking apparatus according to the invention. Now, an embodiment of the second image-taking apparatus of the invention will be described.

The embodiment of the second image-taking apparatus of the invention is the same as the embodiment of the first image-taking apparatus except for part of the internal configuration. Therefore, the same components as those of the embodiment of the first image-taking apparatus will be denoted by the same reference characters as those of the embodiment of the first image-taking apparatus, and the following description will focus on only the difference.

Figure 8:
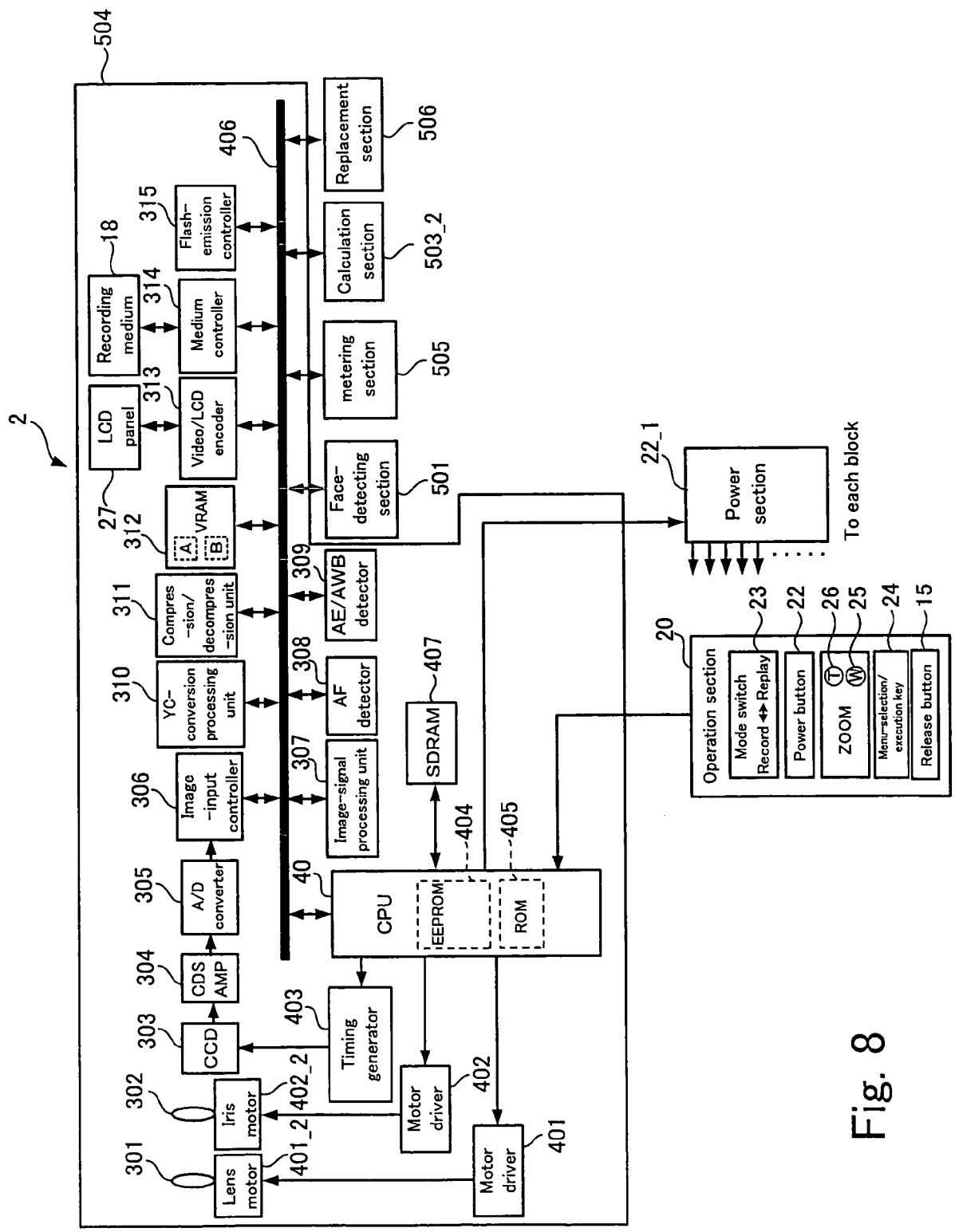
FIG. 8 is a block diagram illustrating the internal configuration of a digital camera according to an embodiment of the second image-taking apparatus of the invention.

FIG. 8 is a block diagram illustrating the internal configuration of a digital camera 2 according to the embodiment of the second image-taking apparatus of the invention.

The digital camera 2 has a metering section 505 in place of the face-metering section 502. The metering section 505 is an element that meters average brightness in a shooting area thereby obtaining a metered value for the shooting area, and also meters individual faces when the faces are detected by a face-detecting section 501, thereby obtaining metered values for the respective faces.

The digital camera 2 also has a calculation section 503_2 in place of the calculation section 503. The calculation section 503_2 is an element that calculates an average correct exposure value for a shooting area based on a metered value obtained by the metering section 505, and also calculates correct exposure values for individual faces based on the respective metered values obtained by the metering section 505.

The digital camera 2 also has a shooting section 504_2 in place of the shooting section 504. The shooting section 504_2 corresponds to the internal configuration of the digital camera 2 except for the metering section 505, a face-detecting section 501, the calculation section 503_2, an operation section 20 and a power section 22_1. In response to one shooting instruction, the shooting section 504_2 performs a shooting with an average correct exposure value for a shooting area calculated by the calculation section 503_2, and also performs shootings for the number of faces based on correct exposure values for the respective faces calculated by the calculation section 503_2.

The digital camera 2 further includes a replacement section 506. The replacement section 506 is an element that replaces image data that represents each face in image data generated by a shooting based on an average correct exposure value for a shooting area calculated by the calculation section 503_2, with image data that represents the corresponding face in image data generated by a shooting based on a correct exposure value for the face.

Figure 9:
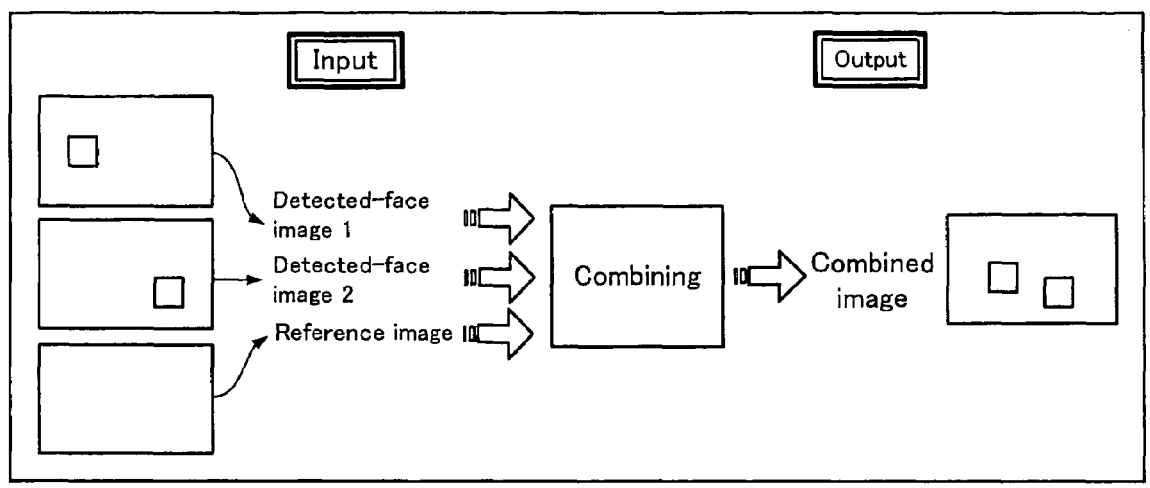
FIG. 9 is a conceptual diagram showing processing performed by a replacement section.

FIG. 9 is a conceptual diagram showing processing performed by the replacement section 506.

For example, when faces of two people are detected by the face-detecting section 501, the shooting section 504_2 generates two images (detected-face images 1 and 2) with correct exposures by shooting based on correct exposure values for the respective faces. The shooting section 504_2 also generates an image (reference image) of the entire screen by shooting based on an average correct exposure value for a shooting area. The replacement section 506 uses the detected-face images 1 and 2 and the reference image as input data. The replacement section 506 extracts two pieces of image data representing the two faces from the detected-face images 1 and 2 respectively, and replaces two pieces of image data representing the corresponding two faces in the reference image with the extracted two pieces of image data.

Now, shooting operation of the digital camera 2 will be described.

Like the digital camera 1, the entire shooting operation of the digital camera 2 is controlled by a CPU 40.

First, as in the case with the digital camera 1, upon turning on of a power button 22 by a user, the operation section 20 detects this power-on operation and the CPU 40 starts running a program stored in a ROM 405. Then, an image is displayed on an LCD panel 27 and the digital camera 2 becomes ready to accept operations for setting a shooting condition or a press of a release button 15. The user can select a face-optimum-exposure mode by selecting a shooting mode through a menu-selection/execution key 24.

Figure 10:
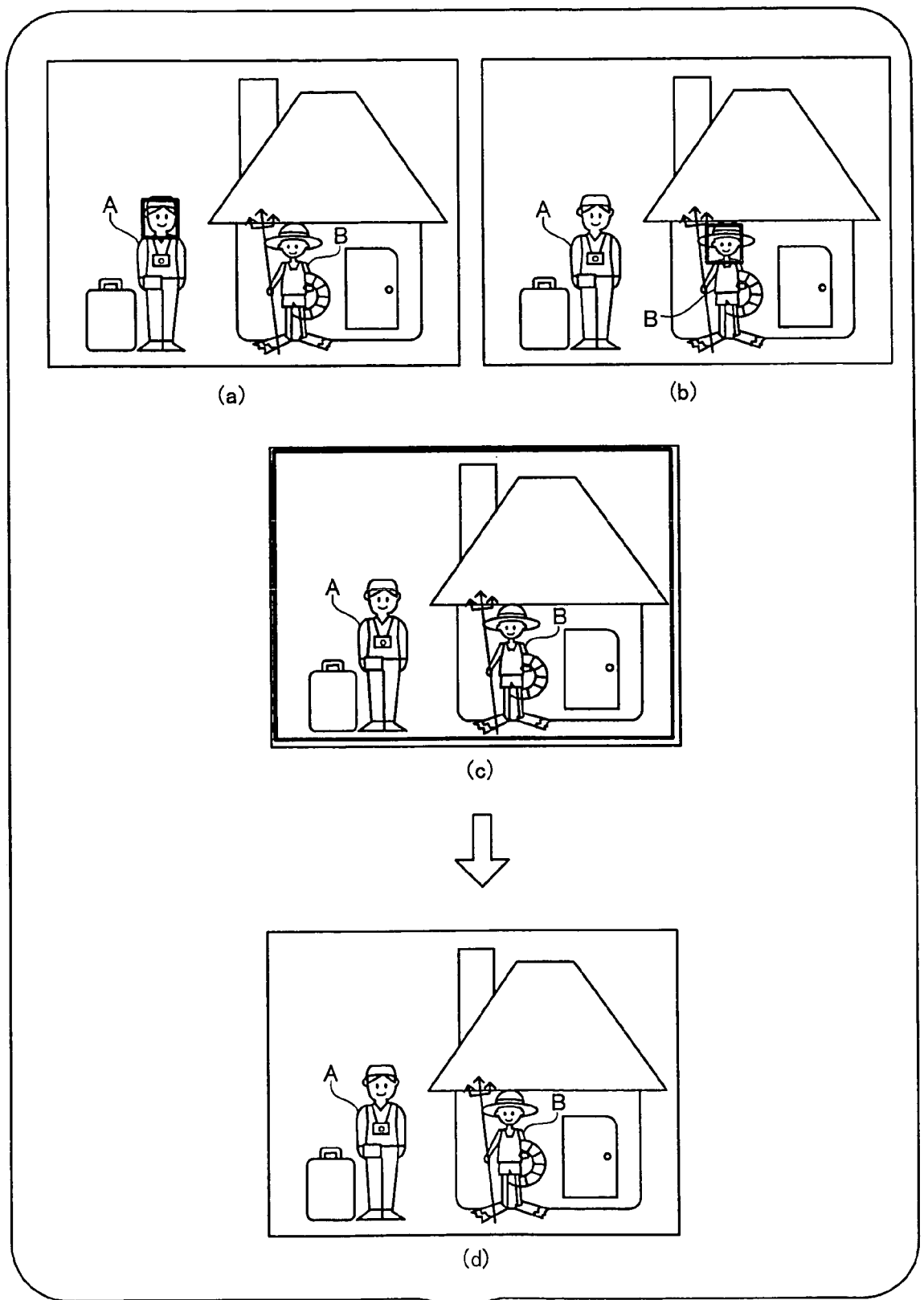
FIG. 10 is a conceptual diagram that shows shooting in a face-optimum-exposure mode.

FIG. 10 is a conceptual diagram that shows shooting in the face-optimum-exposure mode.

Upon selection of the face-optimum-exposure mode, the metering section 505 meters each face within a shooting area.

Part (a) of FIG. 10 shows a shooting area where two people are present. First, the face of a person A is metered and a correct exposure value for the person A is calculated. Then, a shooting is performed based on the correct exposure value for the face of the person A, and as a result, the detected-face image 1 is generated. Subsequently, the face of a person B is metered and a correct exposure value for the person B is calculated. Then, a shooting is performed based on the correct exposure value for the face of the person B and as a result, the detected-face image 2 (part (b) of FIG. 10) is generated. Subsequently, the entire shooting screen that is a shooting area is metered and an average correct exposure value for the shooting area is calculated. Then, a shooting is performed based on the average exposure value and as a result, the reference image (part (c) of FIG. 10) is generated.

Afterward, the replacement section 506 replaces two pieces of image data that represent the two faces in the image data describing the reference image, with two pieces of image data that represent the corresponding two faces in the image data describing the detected-face images 1 and 2, thereby generating a replaced image (part (d) of FIG. 10).

Now, shooting in the face-optimum-exposure mode will be described more in detail below.

Figure 11:
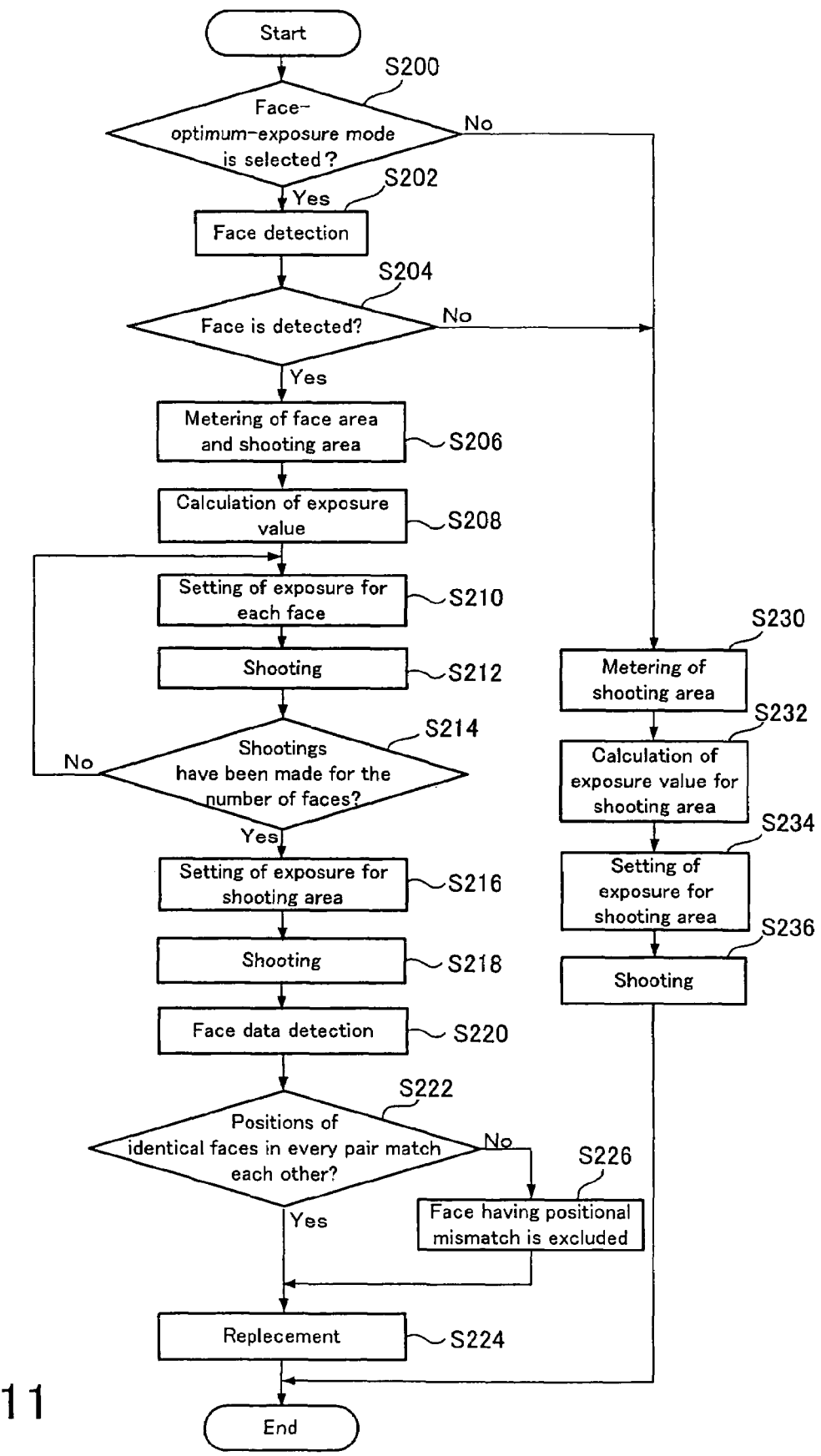
FIG. 11 is a flowchart showing shooting operation performed by the digital camera according to the embodiment of the second image-taking apparatus of the invention.

First, upon a half press of the release button 15 by a user, shooting processing shown in FIG. 11 begins.

FIG. 11 is a flowchart showing shooting operation performed by the digital camera 2 according to the embodiment of the second image-taking apparatus of the invention.

The CPU 40 determines whether the face-optimum-exposure mode is selected or not (step S200).

If it is determined that the face-optimum-exposure mode is selected, the CPU 40 causes the face-detecting section 501 to execute processing for detecting faces in a subject image (step S202).

Subsequently, it is determined whether a face is detected or not (step S204).

If it is determined that a face is detected, the flow proceeds to step S206 where the metering section 505 meters the detected face or every face when two or more faces are detected by the face-detecting section 501, thereby obtaining a metered value for each face. The metering section 505 also meters average brightness in a shooting area thereby obtaining a metered value for the shooting area. In the following description, it is assumed that two or more faces are detected.

Then, the calculation section 503_2 calculates correct exposure values for the respective faces based on the respective metered values obtained by the metering section 505, and also calculates an average correct exposure value based on the metered value for the shooting area obtained by the metering section 505 (step S208).

Subsequently, in a manner similar to FIG. 5, an exposure for one of the faces is set (step S210) and a shooting is performed (step S212).

Upon completion of the shooting for the one face (person), it is determined whether a shooting has been made for every face or not (step S214). If it is determined that a shooting has been made for every face, the flow proceeds to step S216. If it is determined that a shooting has not been made for every face, the flow returns to step S210.

Upon completion of the shootings for all the faces, the average correct exposure value for the shooing area calculated by the calculation section 503_2 is set (step S216).

Subsequently, a shooting is performed based on the average correct exposure value for the shooing area calculated by the calculation section 503_2 (step S218).

After image data (reference image) representing the shooting area corresponding to the entire screen is generated, pieces of image data representing the respective faces in the generated image data are detected (step S220).

At step S222, the detected pieces of image data representing the respective faces in the reference image are compared to pieces of image data (detected-face images) representing the corresponding faces obtained by the shootings with the correct exposure values for the respective faces at step S212. Thus, it is determined whether the positions of the identical faces in every pair, one in the reference image and the other in the detected-face image, match each other (step S222).

When it is determined that the positions of the identical faces in every pair match each other, the flow proceeds to step S224. If there is a positional mismatch in a certain pair of identical faces, the flow proceeds to step S226 where the faces in this pair are determined to be left out of replacement processing and then, the flow proceeds to step S224.

As described above, the replacement section 506 replaces the image data representing the faces in the reference image with the image data representing the corresponding faces in the detected-face images, thereby generating a replaced image (step S224). The replaced image is stored in the recording medium 18 and this processing routine is completed.

Meanwhile, if it is determined that the face-optimum-exposure mode is not selected at step S200 or no face is detected at step S204, the flow proceeds to step S230 where the metering section 505 meters a shooting area corresponding to the entire screen thereby obtaining a metered value. Subsequently, based on the metered value obtained by the metering section 505, the calculation section 503_2 calculates an average correct exposure value for the shooting area (step S232). Afterward, the calculated exposure value is set (step S234), and a shooting is performed (step S236) Then, this processing routine is completed.

As described above, in the digital camera 2 according to the embodiment of the second image-taking apparatus of the invention, when image data generated based on an average correct exposure value for a shooting area includes image data representing faces, this image data representing the faces is replaced with image data representing the corresponding faces generated based on correct exposure values for the respective faces. As a result, there is produced image data representing an image that includes the faces shot with exposures suited to the respective faces. Accordingly, it is possible for a user to obtain image data for an image that incorporates both the result of metering the entire shooting area and the results of metering faces.

Now, there will be described an embodiment of the third image-taking apparatus of the invention. The embodiment of the third image-taking apparatus is similar to the embodiment of the second image-taking apparatus and thus, similar features will not be shown and described. The following description will focus on features different from the embodiment of the second image-taking apparatus.

Figure 12:
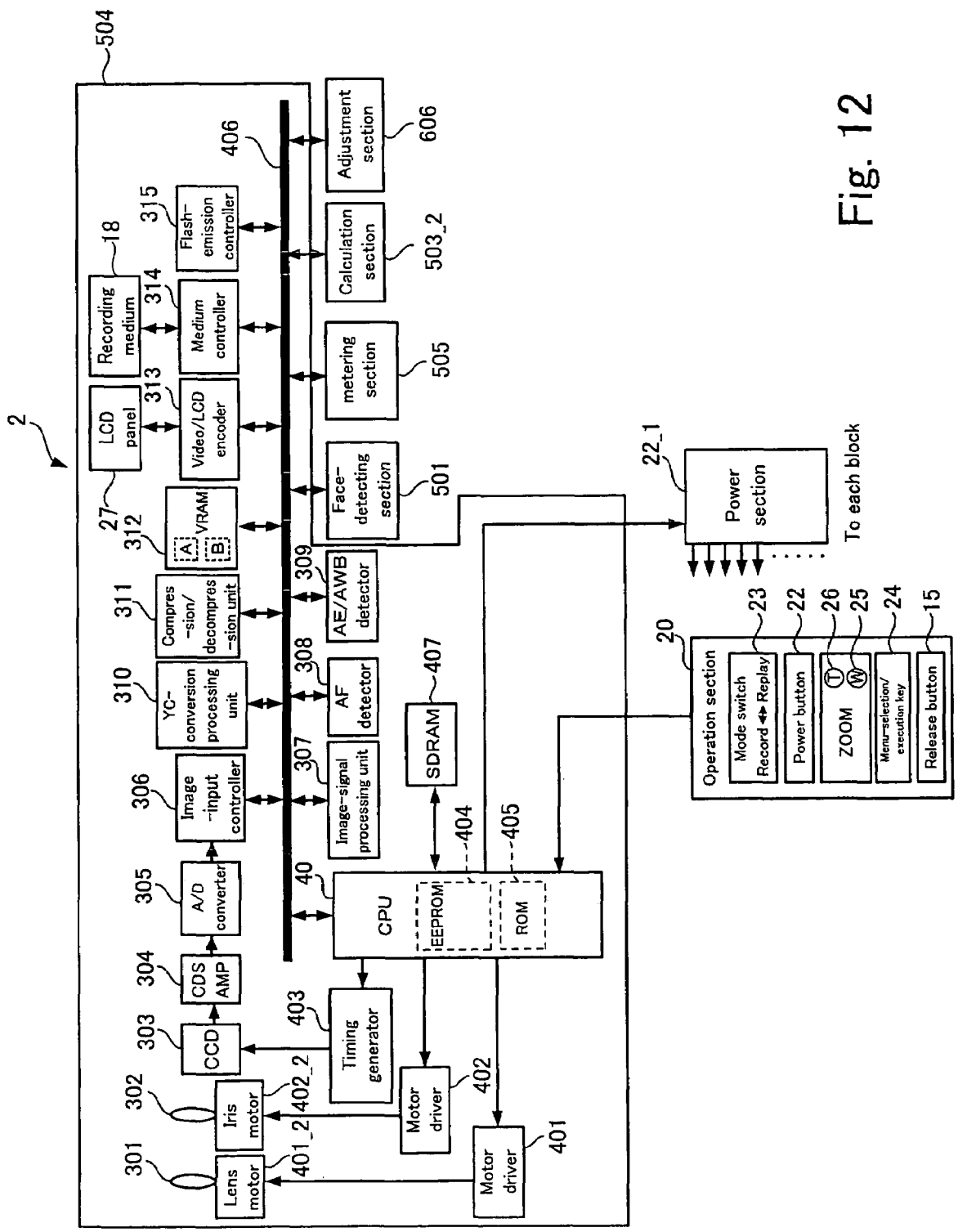
FIG. 12 is a block diagram illustrating the internal configuration of a digital camera according to an embodiment of the third image-taking apparatus of the invention.
Figure 13:
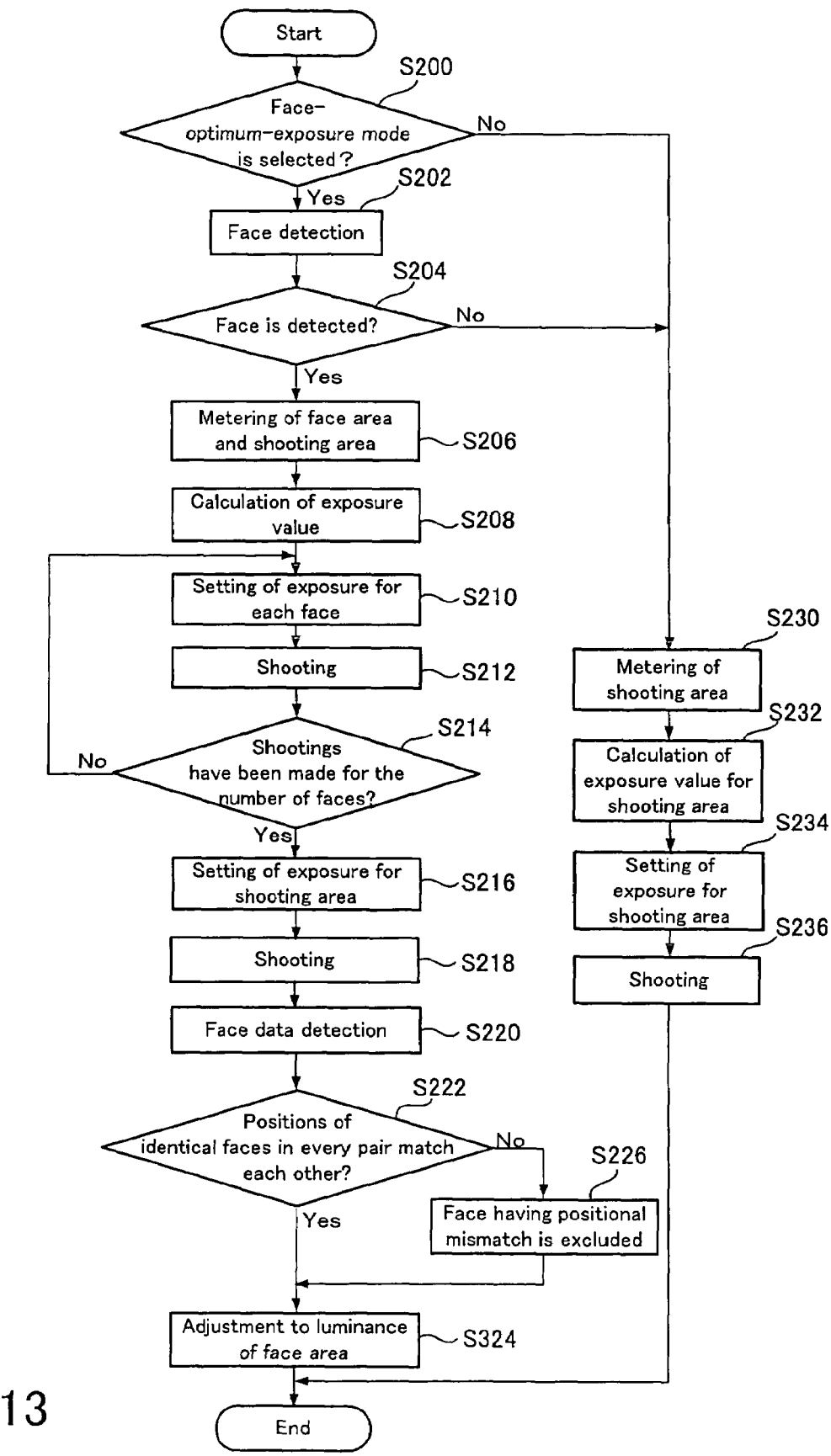
FIG. 13 is a flowchart showing shooting operation performed by the digital camera according to the embodiment of the third image-taking apparatus of the invention.

FIG. 12 is a block diagram illustrating the internal configuration of a digital camera according to the embodiment of the third image-taking apparatus of the invention. FIG. 13 is a flowchart showing shooting operation performed by the digital camera shown in FIG. 12.

The block diagram shown in FIG. 12 is similar to FIG. 8 except that an adjustment section 606 is provided in place of the replacement section 506. Also, the flowchart shown in FIG. 13 is similar to FIG. 11 except that step S324 is provided in place of step S224 that is the last step in the flowchart shown in FIG. 11. The following description will focus on these features (adjustment section 606 in FIG. 12 and step S324 in FIG. 13).

At step S324, the adjustment section 606 adjusts a luminance value for each face in the reference data (data value representing image data related to each person) so that the luminance value becomes equal to image data in the detected-face image of the same person. As a result, the adjustment section 606 generates an adjusted image where exposures suitable for the entire area as well as the face of each person are realized at this step. The adjusted image obtained here is then stored in a recording medium 18, and this processing routine ends.

As described above, in the digital camera according to the embodiment of the third image-taking apparatus, a part, which corresponds to each face, of the image data generated based on the average correct exposure value suitable for the entire shooting area is adjusted to image data having a correct exposure suitable for the image data representing each face. Accordingly, a user can obtain image data representing an image where a result of measuring the entire shooting area as well as a result of measuring each face are reflected.

As described above, according to the invention, it is possible to provide an image-taking apparatus that is capable of shooting an image with a correct exposure for each face based on an exposure value suited to each face, even when two or more faces are detected within a shooting area.

What is claimed is:

1. An image-taking apparatus that includes an imaging device and generates image data representing a subject image formed on the imaging device in response to a shooting operation, the apparatus comprising:
    a face-detecting section that detects a face in the subject image;
    a face-metering section that meters individual faces when the faces are detected by the face-detecting section, thereby obtaining metered values for the respective faces;
    a calculation section that calculates correct exposure values for the respective faces based on the metered values obtained by the face-metering section; and
    a shooting section that performs, in response to a single shooting instruction, shootings with correct exposures for the respective faces based on the correct exposure values for the respective faces calculated by the calculation section.

2. The image-taking apparatus according to claim 1, wherein when no face is detected by the face-detecting section, the shooting section performs a shooting based on an average correct exposure value for a shooting area.

3. An image-taking apparatus that includes an imaging device and generates image data representing a subject image formed on the imaging device in response to a shooting operation, the apparatus comprising:
    a face-detecting section that detects a face in the subject image;
    a metering section that meters brightness in a shooting area and also meters individual faces when the faces are detected by the face-detecting section, thereby obtaining a metered value for the shooting area and metered values for the respective faces;
    a calculation section that calculates an average correct exposure value for the shooting area based on the metered value for the shooting area obtained by the metering section, and also calculates correct exposure values for the respective faces based on the metered values for the respective faces obtained by the metering section;
    a shooting section that, in response to a single shooting instruction, performs a shooting with a correct exposure for the shooting area based on the correct exposure value for the shooting area calculated by the calculation section, and also performs shootings with correct exposures for the respective faces based on the correct exposure values for the respective faces calculated by the calculation section; and
    a replacement section that replaces pieces of image data representing faces in image data generated by the shooting based on the average correct exposure value for the shooting area calculated by the calculation section, with pieces of image data representing the corresponding faces in image data generated by the shootings performed by the shooting section.

4. The image-taking apparatus according to claim 3, wherein when no face is detected by the face-detecting section, the shooting section performs a shooting based on the average correct exposure value for the shooting area and the replacement section stops operating.

5. The image-taking apparatus according to claim 3, wherein, only for a face whose face position on a first image obtained by a shooting based on the average correct exposure value for the shooting area calculated by the calculation section matches a face position of a corresponding face in a second image obtained by a shooting based on the correct exposure value for each face calculated by the calculation section, the replacement section replaces image data representing the face in the first image with image data representing the corresponding face in the second image.

6. An image-taking apparatus that includes an imaging device and generates image data representing a subject image formed on the imaging device in response to a shooting operation, the apparatus comprising:
    a face-detecting section that detects a face in the subject image;
    a metering section that meters brightness in a shooting area and also meters individual faces when the faces are detected by the face-detecting section, thereby obtaining a metered value for the shooting area and metered values for the respective faces;
    a calculation section that calculates an average correct exposure value for the shooting area based on the metered value for the shooting area obtained by the metering section, and also calculates correct exposure values for the respective faces based on the metered values for the respective faces obtained by the metering section;
    a shooting section that, in response to a single shooting instruction, performs a shooting with a correct exposure for the shooting area based on the correct exposure value for the shooting area calculated by the calculation section, and also performs shootings with correct exposures for the respective faces based on the correct exposure values for the respective faces calculated by the calculation section; and
    an adjustment section that adjusts pieces of image data representing faces in image data generated by the shooting based on the average correct exposure value for the shooting area calculated by the calculation section, to pieces of image data identical to pieces of image data representing the corresponding faces in image data generated by the shootings performed by the shooting section.

7. The image-taking apparatus according to claim 6, wherein when no face is detected by the face-detecting section, the shooting section performs a shooting based on the average correct exposure value for the shooting area and the adjustment section stops operating.

8. The image-taking apparatus according to claim 6, wherein, only for a face whose face position on a first image obtained by a shooting based on the average correct exposure value for the shooting area calculated by the calculation section matches a face position of a corresponding face in a second image obtained by a shooting based on the correct exposure value for each face calculated by the calculation section, the adjustment section adjusts image data representing the face in the first image to image data identical to image data representing the corresponding face in the second image.

* * * * *